UNITED STATES PATENT OFFICE.

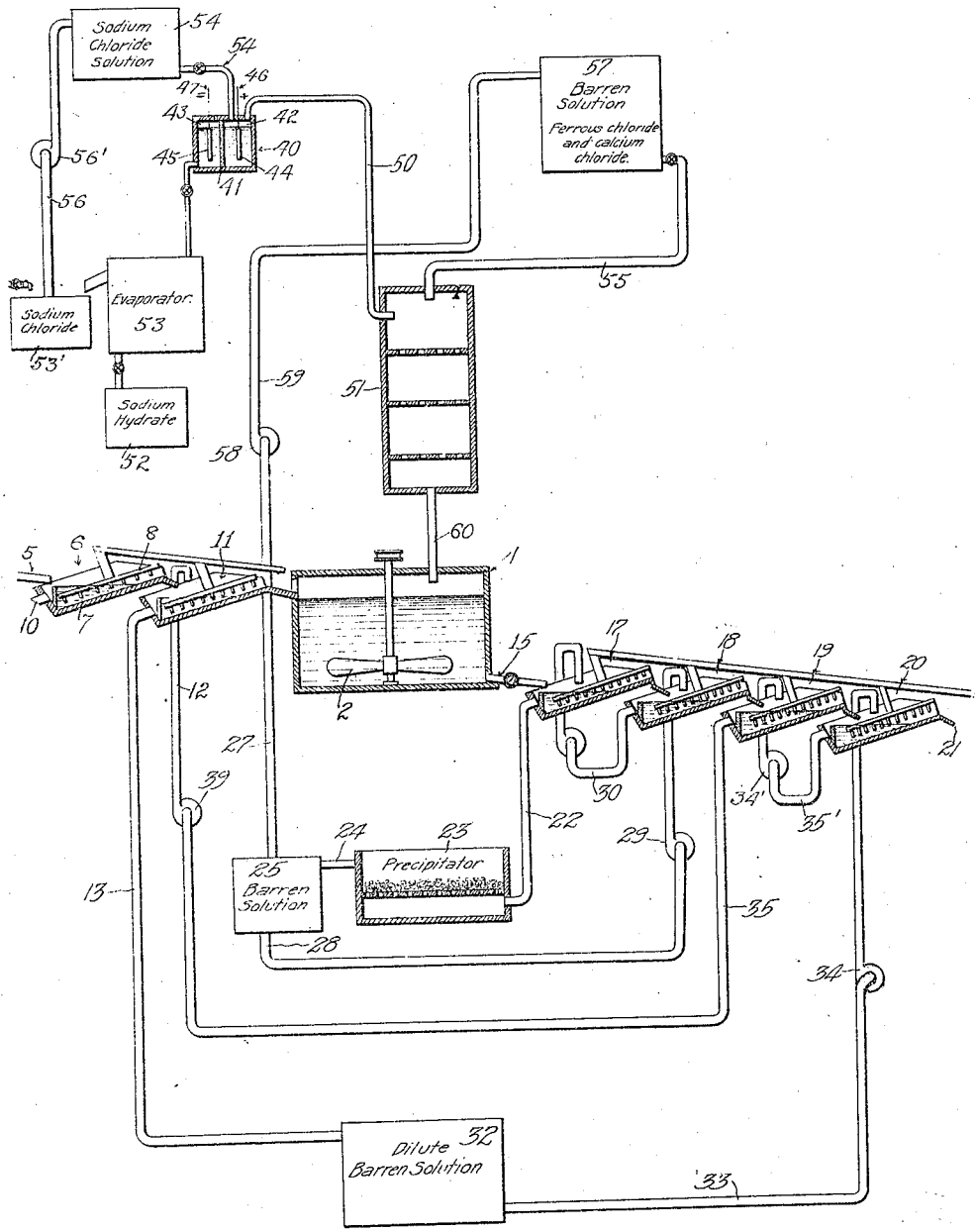

WALTER AUGUST SCHMIDT, OF LOS ANGELES, CALIFORNIA, ASSIGNOR TO WESTERN PRECIPITATION COMPANY, OF LOS ANGELES, CALIFORNIA, A CORPORATION OF CALIFORNIA.

PROCESS OF EXTRACTING METALS FROM THEIR ORES.

1,237,221.   Specification of Letters Patent.   Patented Aug. 14, 1917.

Application filed February 18, 1916. Serial No. 79,100.

*To all whom it may concern:*

Be it known that I, WALTER AUGUST SCHMIDT, a citizen of the United States, residing at Los Angeles, in the county of Los Angeles and State of California, have invented a new and useful Process for Extracting Metals from Their Ores, of which the following is a specification.

This invention relates to the extraction of copper or similar metals from ores containing the same, by means of a leaching solution which dissolves the copper in the form of copper chlorid. In such cases it is usual to provide the leach with a small percentage of chlorin compound such as sodium chlorid or of calcium chlorid so as to retain cuprous copper in solution. My process is particularly applicable to treatment of ores containing an alkaline earth metal such as calcium, for example in the form of calcite, and one object of the present invention is to utilize the calcium chlorid formed in the leaching operation as a carrier for the cuprous copper in solution, in such manner that only the chlorin constituent need be supplied in cyclic operation to maintain the required amount of such carrier in the solution. Another object of the invention is to provide a process of this kind in which all the chlorin used in the operation is supplied in active form, as free chlorin, thereby producing maximum effect for a given amount of chlorin supplied. Another object of the invention is to so carry out the process that the loss of chlorin is reduced to a minimum. A further object of the invention is to provide for supplying the chlorin in such manner that the by-products obtained from the production of the chlorin may wholly or partly pay the cost of such production, so that unavoidable loss of chlorin in the tailings and wash water does not seriously affect the cost of the process.

The accompanying drawing is a side elevation of an apparatus suitable for carrying out my invention.

The apparatus shown in the drawing comprises an agitator 1, means for supplying finely divided ore thereto, means for receiving the material from the agitator and discharging it with as little loss of solution as possible, an electrolytic cell, and means for supplying chlorin generated in said cell to the solution supplied to the agitator.

The agitator 1 may be of any suitable or usual type, comprising for example, a tank provided with agitating means 2, said tank being preferably covered.

In general the ore to be treated will be supplied to the apparatus from a concentrator or other means delivering the ore in a finely divided state along with considerable water. I prefer to provide means for dewatering the ore and replacing the water with a special replacing solution, for example, a solution of calcium chlorid. The ore is supplied by launder 5 to a dewatering device 6 constructed for example as a Dorr classifier, being provided with a tank 7 whose bottom inclines upwardly toward the discharge end, so that a raking device 8, operated automatically in the usual manner, may draw the ore over the discharge end, the water being largely left behind and running over into an overflow outlet 10. The ore discharges from this device into a device 11 of similar construction to device 6, said device 11 discharging into the agitator 1. A supply pipe 12 and an outlet pipe 13 are provided for device 11, respectively for supply of displacing fluid to said device and for drawing off such fluid.

The outlet pipe 15 of the agitator 1 discharges into the first of a series of devices 17, 18, 19 and 20, each similar in construction to device 6 and each discharging the ore into the succeeding device of the series, until the ore reaches the last device, from which it discharges by suitable means 21. The overflow from device 17 flows through pipe 22 to precipitating tank 23, from which a pipe 24 leads to the sump or barren solution tank 25. Tank 25 is preferably provided with two outlet pipes 27 and 28, for conducting the barren solution respectively in two different cycles of circulation, namely a regenerating cycle through pipe 27 and the regenerating means hereinafter described and a displacing cycle through pipe 28 and pump 29 to device 18, from which the liquid is pumped by pump 29 through pipe 30 to device 17, the overflow from which runs as stated to the precipitator. A tank 32 for diluted barren solution is connected by pipe 33 to a pump 34 whose outlet pipe leads to the device 20, connected by piping 35′ and pump 34′ to device 19, and the overflow outlet pipe 35 of said device is connected with pump 39 discharging into the pipe 12 for supplying solution to device 11, the outlet pipe 13 for said device leading back to the tank 32.

The regenerating apparatus comprises an electrolytic cell or cells 40 provided with a pervious diaphragm 41 dividing the cell into anode and cathode compartments 42 and 43, containing respectively the anode 44 and cathode 45, connected to the wires 46 and 47 of an electric supply circuit. The anode compartment 42 is covered and is connected by pipe 50 to a suitable device such as tower 51 for introducing the chlorin into the leaching solution. The cathode compartment of the cell is connected to suitable means, indicated at 53 for separating the sodium hydrate from the sodium chlorid. Said means 53 may comprise an evaporating tank where the solution is evaporated to crystallize out the sodium chlorid, the sodium crystals being discharged into a brine tank 53¹ and the sodium hydrate being discharged into a tank 52. A tank 54 is provided for supplying sodium chlorid solution through pipe 54′ to the cell 40, and this tank may be supplied, in part, from the brine tank 53′ through a pipe 56 and pump 56¹.

The leaching solution may be supplied to the absorption tower 51 by a pipe 55 leading from a storage tank 57 for containing barren solution, the solution being pumped to said tank from the outlet pipe 27 of tank 25, by a pump 58 connected by pipe 59 to the tank 57. The outlet pipe 60 for regenerated solution leads from tower 51 to the agitator 1.

My process is carried out in the above described apparatus as follows: A concentrated solution of sodium chlorid, for example, a saturated solution, is supplied to the cell 40 from tank 54, and is electrolyzed therein, producing sodium hydrate in the anode compartment, and free chlorin in the cathode compartment. The cathode solution containing sodium hydrate, together with sodium chlorid, is led through pipe 53′ to the apparatus 53 in which it is evaporated so as to cause the sodium chlorid to crystallize out of the solution. The sodium hydrate solution is then passed to tank 52 for evaporation to form caustic soda, and the sodium chlorid is passed to tank 53′, wherein it is mixed with water to form a saturated solution of NaCl which is then pumped back to tank 54. The free chlorin passes from the anode compartment through pipe 50 to tower 51 wherein it is absorbed into the solution passing through the tower from tank 57. Said solution consists essentially of a solution of calcium chlorid in water (say 5 to 10 per cent. strength) containing also from $\frac{1}{10}$ to $\frac{5}{10}$ per cent. of iron as ferrous chlorid, the amount of iron being determined by the nature of the ore. The action of the chlorin as it is absorbed into said solution oxidizes the ferrous chlorid to ferric chlorid, and sufficient chlorin may be supplied to also provide some free chlorin in the solution. The ore which is assumed for example to consist of native copper ore, delivered to the device 6, is dewatered therein and discharged into device 11, where it is supplied with diluted barren solution from pipe 35, so that the material passing from the device 11 to the agitator will contain calcium chlorid solution of nearly the same strength as the leaching solution, thereby avoiding excessive dilution of such solution. When the ore with the weak barren solution is delivered into the agitator 1, it is mixed with the strong regenerated barren solution supplied from tower 51, and it is subjected to the action of the ferric chlorid and free chlorin in said regenerated solution, with the result that the copper is dissolved. The operation may be so controlled that a large portion of the copper in the final solution is present as cuprous copper, which is held in solution by reason of the calcium chlorid present, and the iron is reduced to ferrous chlorid, the solution of the copper being effected in part by the chlorin derived from the ferric chlorid and also in part by the free chlorin. The resulting pregnant solution is drawn off together with the finely divided ore through pipe 15 to the device 17 wherein it is displaced from the ore by barren solution supplied to device 17 from device 18 and to device 18 from pipe 28 leading from tank 25, the effect of the two displacing actions in devices 17 and 18 being to substitute for the pregnant solution mixed with the ore, a barren solution which may be discharged from the device 18 along with the gangue without loss of copper. The pregnant solution passes from device 17 through pipe 22 to the precipitator 23, where it is subjected to the action of metallic iron, causing the copper to be precipitated and the barren solution then passes through pipe 24 to tank 25, whence a portion of such solution is passed through pipe 27, pump 58 and pipe 59 to the tank 57 for repetition of the cycle. Another portion of the barren solution passes through the pipe 28 to the device 18 where it serves to displace the pregnant solution from the ore or gangue as above described.

In working an ore containing a considerable amount of calcium carbonate or similar compound, the action of the chlorin in the leaching solution causes a certain amount of calcium chlorid to be taken up into the leaching solution. This calcium chlorid tends to accumulate in the solution in the cyclic operation, and the process is so carried out that the amount of calcium chlorid taken up by the solution by the action of the leaching agent on the calcium compound in the ore is just balanced by the loss of calcium chlorid carried off with the waste or tailings discharged at 21. In order to minimize the loss of chlorin the barren solution resulting from the displacement of pregnant solution by barren solution in devices 17 and 18, is in turn replaced by a solution from the overflow of device 12, this last replacing solution being a dilute barren solution which contains considerably less percentage of calcium chlorid than is present in the barren solution coming from device 18. The solution passing from device 19 to the device 12 is weaker in calcium chlorid than the leaching solution in the agitator, and constitutes a calcium chlorid solution of a moderate strength, intermediate the full strength of the leaching solution and the strength of the diluted barren solution in tank 32. In the device 12 this moderately strong solution of calcium chlorid replaces the water coming with the ore from device 6, so that the ore passes to the agitator 1 with a solution containing calcium chlorid and chlorid of iron of nearly the proper strength for leaching. The water carried by the ore into device 12 is displaced by this calcium chlorid solution and the resulting dilute solution of calcium chlorid passes from device 12, through pipe 13 to tank 32, whence it is drawn by pipe 33 back to the device 20. In the devices 20 and 19, this dilute calcium chlorid solution replaces the moderately strong solution coming from device 18, such moderately strong solution passing by pipe 35 back to the device 12, and the dilute solution being discharged along with the gangue, at 21, so that the only loss of chlorin to the cycle is that due to the small percentage of chlorin contained in this dilute solution.

As distinguished from the usual processes of copper leaching, my process as above described uses only the amount of sodium chlorid which is required to supply the chlorin for solution of the copper, and no chlorin salt is required to be added to the solution at any time to serve as a carrier for the cuprous copper. Furthermore, all the chlorin is supplied to the cycle, in active form, so that there is no waste due to supply of inert or "carrier" chlorin. Moreover, by separating the sodium constituent, and replacing it, as far as necessary, by a base metal (calcium) naturally present in the ore, I am enabled to utilize such constituent in forming a by-product (sodium hydrate) which is of sufficient value to pay wholly or largely for the chlorin supplied to the cycle, so that the unavoidable loss of chlorin, due to the action of the chlorin on the calcium compound in the ore, necessitating the eventual discharge of an equivalent amount of chlorin in the form of calcium chlorid, in the tailings, does not constitute any serious charge on the process.

In the action of the chlorin in the leaching solution on the calcium compound present in the ore, more or less hypochlorous acid may be formed. For example, by the action of the ferric chlorid on calcium carbonate, ferric carbonate or hydrate may be formed, and in the presence of free chlorin such carbonate or hydrate may be reconverted to ferric chlorid, and at the same time free hypochlorous acid will be produced. The free chlorin is therefore of advantage not only in directly acting on the ore, but also in regenerating the chlorid of iron and in producing free hypochlorous acid, the latter being an effective leaching agent, particularly when any of the copper is present as sulfid.

In the cycle above described the production of calcium chlorid by the action of chlorin on the calcium compound in the ore is inhibited or reduced by reason of the calcium chlorid already formed and in solution, and in so far as this inhibiting action takes place the presence of calcium chlorid in solution will correspondingly reduce the loss of chlorin in the cycle. In starting the process calcium chlorid or sodium chlorid may be supplied to the solution in sufficient amount to serve as a carrier for the cuprous copper, or, if desired, such calcium chlorid may be accumulated in the solution by the action of the leaching agent on the base metal compound.

What I claim is:

1. The process of extracting a metal from an ore thereof, supplied together with water, which consists in displacing such water by a solution of an alkaline earth metal chlorin, introducing into such solution a metallic chlorid capable of reduction to a lower chlorid, so as to leach the metal from the ore to form a pregnant solution, replacing such pregnant solution by a barren solution, precipitating the extracted metal from said pregnant solution to form such barren solution, and replacing such barren solution from the ore by a dilute alkaline earth metal solution produced in the displacement of water from the ore by alkaline earth metal chlorid solution.

2. The process of extracting a metal from its ores, which consists in leaching the ore with a solution containing chlorin in an active condition for solution of the metal, and also containing a chlorin compound acting as a carrier for the dissolved metal, withdrawing the solution from the ore, precipitating said metal therefrom, regenerating a portion of the resulting barren solution for repetition of the process, and passing another portion of such barren solution into the ore coming from the leaching operation to displace the pregnant solution therefrom.

3. The process of extracting a metal from its ores, which consists in leaching the ore with a solution containing chlorin in active condition to form a chlorid of such metal, and also containing a clorin compound acting as a carrier for such chlorid, displacing the solution from the ore by a barren solution, precipitating said metal from the solution to form such barren solution, regenerating a portion of such barren solution by the action of free clorin, for repetition of the process, displacing the barren solution from the ore by a more dilute barren solution, and passing the barren solution so displaced into a fresh portion of ore, preparatory to leaching the same, to displace water from such fresh portion of ore and produce dilute barren solution for repetition of such displacing operation.

4. The process of extracting a metal from its ores containing a compound of a base metal whose chlorid is capable of acting as a carrier for a chlorid of the metal to be extracted, which consists in electrolyzing a concentrated solution of sodium chlorid to produce free chlorin and sodium hydrate, separating such sodium hydrate as a by-product, absorbing said chlorin in a solution containing a metallic chlorid capable of oxidation to a higher chlorid, to produce a solution containing chlorin in active form, bleaching the ore with such solution, thereby dissolving as chlorid, the metal to be extracted, and also dissolving, as chlorid, a portion of the base metal in the ore, forming a chlorid acting as a carrier for the metal to be extracted.

5. The process of extracting a metal from an ore thereof containing a base metal compound which consists in leaching such ore with a solution containing chlorin in active condition in such manner as to extract said metal from the ore and to react with such base metal compound to form a base metal chlorid capable of retaining the extracted metal in solution, removing the resulting pregnant solution from the ore, repeating the operation in cyclic manner so as to accumulate such base metal clorid in the solution until the amount thereof so accumulated is sufficient to act as a carrier for the extracted metal; and then continuing such cyclic operation in such manner as to supply to the solution during each cycle, by the above stated reaction, an amount of base metal chlorid equal to the amount lost from the cycle with the tailings.

6. The process of extracting a metal from an ore thereof containing a base metal compound which consists in leaching the ore with a solution containing ferric chlorid and free chlorin, in such manner as to dissolve the metal to be extracted together with some of such base metal, as chlorids, the chlorin also serving to redissolve iron precipitated from solution during the leaching operation by the action of the base metal compound and to form an active leaching compound containing oxygen and chlorin, withdrawing the resulting pregnant solution from the ore, precipitating the extracted metal from the pregnant solution, and regenerating the barren solution by supplying chlorin thereto, all in cyclic manner.

7. The process of extracting a metal from an ore thereof containing a base metal compound, said ore being supplied together with water, which consists in replacing such water with a barren solution, then supplying to the ore a leaching agent containing ferric chlorid and free chlorin so as to dissolve the metal to be extracted and some of the base metal as chlorids, the chlorin also serving in part to redissolve iron precipitated from solution during the leaching operation by the action of the base metal compounds, withdrawing the resulting pregnant solution from the ore, replacing the remaining pregnant solution from the ore with barren solution, precipitating the extracted metal from the pregnant solution to form such barren solution, regenerating a portion of such barren solution for cyclic repetition of the process, and replacing the barren solution in the tailings with the dilute barren solution resulting from the first mentioned replacement wherein the water entering with the ore is replaced by barren solution.

8. The process of extracting a metal from its ores which consists in leaching the ore with a solution containing chlorin in active condition together with a chlorid capable of retaining the extracted metal in solution, displacing the resulting pregnant solution from the ore by barren solution, precipitating the metal from said pregnant solution to form such barren solution and regenerating the barren solution by the action of free chlorin for repetition of the process.

9. The process of extracting a metal from an ore thereof supplied, together with water, which consists in replacing such water with barren solution producing a dilute barren solution, supplying to the ore and barren solution an active leaching agent, replacing the resulting pregnant solution with barren solution, precipitating the extracted metal from said pregnant solution to form the said barren solution and replacing the barren solution in the tailings with dilute barren solution produced as aforesaid.

In testimony whereof I have hereunto set my hand at Washington, D. C., this 15th day of February, 1916.

WALTER AUGUST SCHMIDT.